United States Patent [19]

Hisey

[11] Patent Number: 5,050,335
[45] Date of Patent: Sep. 24, 1991

[54] MINNOW AND FISH PRESERVING CONTAINER

[76] Inventor: Frank L. Hisey, P.O. Box 205, New Bedford, Pa. 16140

[21] Appl. No.: 579,947

[22] Filed: Sep. 10, 1990

[51] Int. Cl.$^5$ ............................................. A01K 97/00
[52] U.S. Cl. ............................................. 43/55; 43/56
[58] Field of Search .................. 43/55, 57.1, 54.1, 56; 206/315.11, 315.1

[56] References Cited

U.S. PATENT DOCUMENTS

| | | |
|---|---|---|
| 2,243,498 | 5/1946 | Candisto . |
| 2,673,454 | 3/1954 | Gallie et al. . |
| 2,800,741 | 7/1957 | Adams . |
| 2,899,103 | 8/1959 | Ebert ............................... 43/54.1 |
| 3,068,607 | 12/1962 | Ward . |
| 3,344,552 | 10/1967 | Glasco . |
| 3,958,359 | 5/1976 | Doughty ............................ 43/55 |
| 4,541,539 | 9/1985 | Matthews .......................... 43/26 |
| 4,697,380 | 10/1987 | Fenske ............................... 43/55 |
| 4,870,778 | 10/1989 | Sheppard . |

FOREIGN PATENT DOCUMENTS 510870  3/1955  Canada ................................. 43/56

*Primary Examiner*—Kurt Rowan
*Assistant Examiner*—Chuck Y. Mah
*Attorney, Agent, or Firm*—Harpman & Harpman

[57] ABSTRACT

A combination minnow and fish preserving container having a first section for containing water and minnows and a second section for containing water and a refrigerant, such as ice, and caught fish. The sections are separated by a thin wall cold conducting partition. The container is formed of insulated structural foam and has a substantially airtight lid portion defining when inverted molds for freezing suitably shaped blocks of ice. The container in use will maintain water and minnows at a temperature below 40° F. whereby minnows in the first section are subjected to a substantial slowing of metabolism and are able to survive for a period of two weeks due to the insulating effeciency arrangement of the cold conducting partition and the substantially airtight closure. When transported to a fishing location, the catch is positioned in the second section where they are suitably refrigerated to maintain freshness for a desirable length of time.

2 Claims, 1 Drawing Sheet

U.S. Patent     Sep. 24, 1991     5,050,335
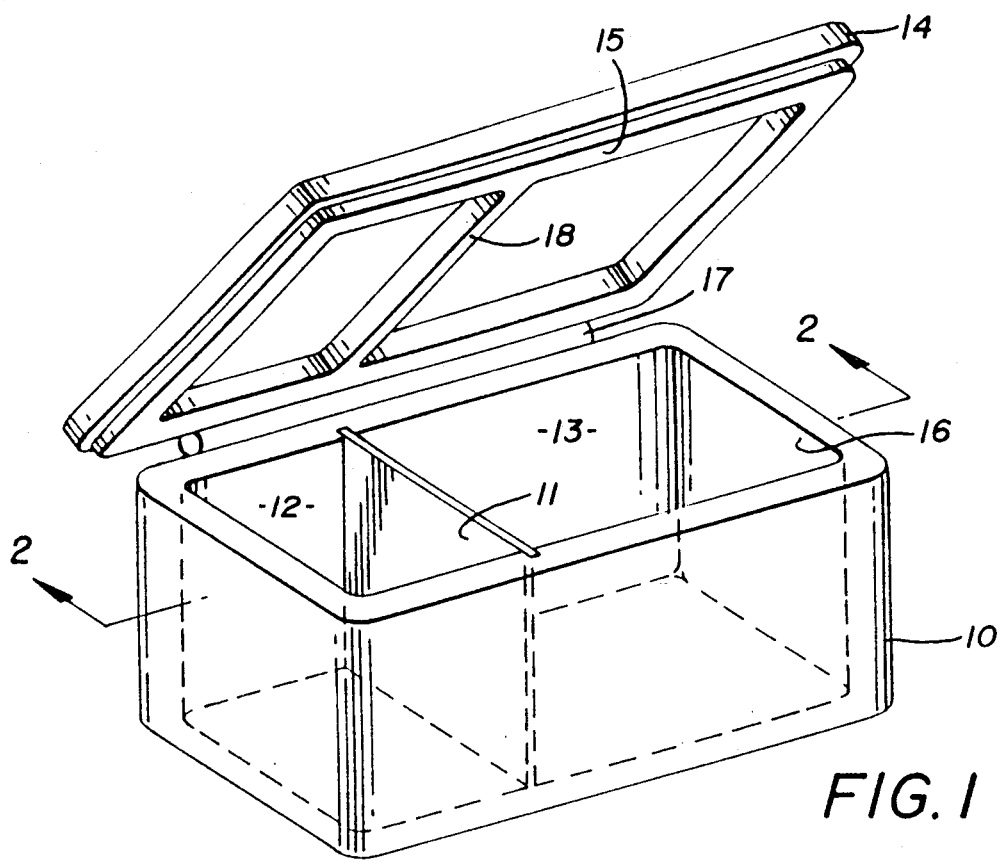
FIG. 1
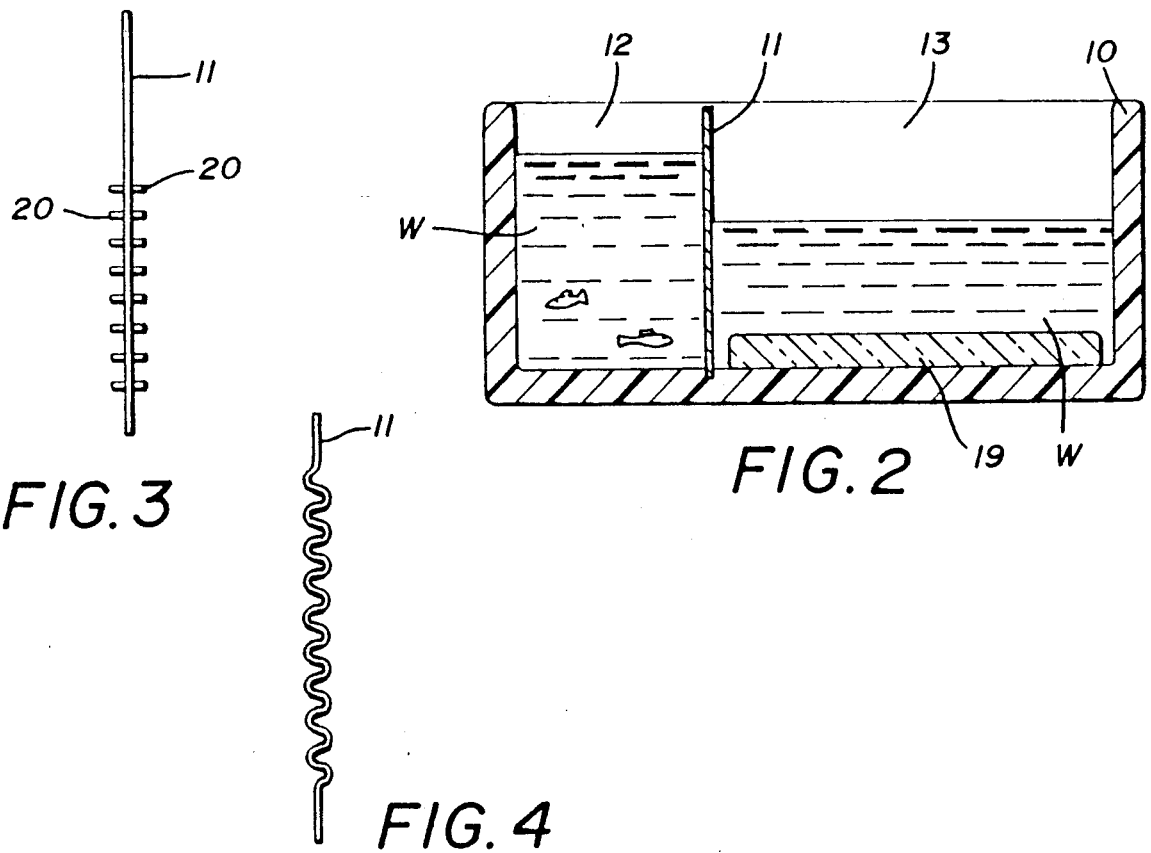
FIG. 3
FIG. 2
FIG. 4

MINNOW AND FISH PRESERVING CONTAINER

BACKGROUND OF THE INVENTION

1. Field of the Invention

This invention relates to live bait and fish containers in which live bait, such as minnows, may be transported along with such fish as are caught on a fishing expedition.

2. Description of the Prior Art

Prior structures of this type employ different shapes and sizes of containers generally having a principal section in which live bait, such as minnows, are transported to a fishing location, some of the prior art structures utilize ice in an attempt to reduce to temperature of the areas thereof in which the live bait is positioned.

See for example U.S. Pat. Nos. 2,243,498, 2,673,454, 2,800,741, 3,068,607, 3,344,552 and 4,870,778.

The present invention discloses a combination minnow and catch preserving container formed of state of the art structural foam insulation having a closure for substantial airtight sealing relation to the container along with a cold conducting thin wall partition arranged in the container to divide a portion thereof into a live bait (such as minnows) preserving condition and at the same time effectively closing the same and the remaining portion of the container from air so that an effective reduced temperature of below 40° F. can be maintained therein.

SUMMARY OF THE INVENTION

A combination live bait and catch preserving container comprises a structure formed of state of the art highly efficient heat insulation such as structural insulating foamed resin with a substantially air sealing closure therefor. A cold conducting thin wall partition sealingly separates the container into first and second sections, one of which is smaller than the other and adapted to contain a suitable amount of water in which live bait, such as minnows, can be subjected to temperatures below 40° F. capable of substantially slowing down the minnows' metabolism and enabling them to be dept alive for two weeks or more. The air sealing closure is so formed as to utilize the sealing structure as molds for freezing ice blocks usable in the container.

DESCRIPTION OF THE DRAWINGS

FIG. 1 is a perspective elevation of the minnow and fish preserving container;

FIG. 2 is a vertical section on line 2—2 of FIG. 1;

FIG. 3 is an end elevation of a modified cold conducting partition of the container; and FIG. 4 is a still further modification of a cold conducting partition therefor.

DESCRIPTION OF THE PREFERRED EMBODIMENT

In its preferred form, the minnow and fish preserving container comprises a rectangular receptacle 10 of a size capable of holding about four gallons of water and ice, the receptacle 10 being formed of a high efficiency heat insulating structural foamed resin capable of maintaining near zero temperatures on one side with a minimum of cold conduction therethrough. A cold conducting thin wall partition 11 is sealingly positioned within the rectangular receptacle 10 so as to preferably form first and second chambers 12 and 13, the chamber 13 being substantially larger than the chamber 12. An air sealing closure 14 formed of the same high efficiency heat insulating structural foamed resin incorporatessa downturned flange 15 of a size and shape to sealingly engage the open upper end 16 of the rectangular receptacle 10. The air sealing closure 14 may be provided with a suitable hinged connection 17, such as for example a live hinge formed of a suitable resin which can if desired be extended to form a covering layer of flexible sheet resin on the outer surface of the air sealing closure 14 as well as the rectangular receptacle 10 if desired.

Alternately, the air sealing closure may be a separate part of the minnow and fish preserving container whereupon a transverse rib 18 formed on its lower surface and extending between the downturned tapered flanges 15 defines molds in which water may be positioned when the air seal enclosure 14 is positioned in inverted relation to a supporting surface and in a below freezing temperature environment whereby ice blocks 19 of suitable sizes may be easily formed for positioning in the second chamber 13 of the rectangular receptacle 10.

By referring now to FIG. 2 of the drawings, a vertical section on line 2—2 of FIG. 1 may be seen and it will be observed that the cold conducting thin walled partition 11 is illustrated as formed of thin metal or the like and that it is sealingly positioned so as to enable the first section 12 to be supplied water W in which minnows may be positioned, while the second section 13 may have a lesser amount of water therein or an equal amount if desired along with a shaped block of ice 19 such as shaped in the inverted air sealing closure 14 as heretofore described.

It will occur to those skilled in the art that the cold conducting thin wall partition 11 may be formed as illustrated in FIG. 3 of the drawings which is an end view of such a modified partition wherein a plurality of small ribs 20 are formed on the opposite sides of the partition 11 so as to increase its cold conducting ability or alternately as in FIG. 4 of the drawings, an end elevation of a further modification of the partition 11 may be seen wherein it has been formed of a continuous undulating section of material in which a series of very small undulations in closely spaced relation from a substantial increase in the surface area of the partition 11 and effectively increase the cold conduction ability of the partition which may be a thin metal sheet.

Those skilled in the art will observe that certain plastic membranes and the like could be mounted on appropriately sized frames ans substituted for the cold conducting partitions described hereinbefore which would operate with comparable efficiency.

In use, a typical sized rectangular container similar to one of the picnic sized so-called IGLOO ® plastic hampers modified as disclosed herein, both with respect to materials, closure, and partitions, will hold about four gallons of water and ice and will effectively hold the temperature in both the chambers 12 and 13 at below 40° F. for a considerable period of time. The minnows in the chamber 12 will survive for a lengthy time, as long as two weeks, if the air sealing closure 14 remains in place in sealing relation to both the rectangular container open top 16 as well as the upper edge of the cold conducting thin walled partition 11 due to the substantial reduction of the metabolism of the minnows.

Tests have determined that the temperature can be as low as 30° F. and ideally at 35° F. wherein the minnows will survive for between two and three weeks. Assuming the minnow and fish preserving container is used on a fishing trip, the minnows will survive for a number of days and the catch can be placed in the second section 13 and thus preserved for several days during the fishing trip and travel, etc.

It will thus be seen that a dual action minnow and fish preserving device has been illustrated and described and having thus described my invention, what I claim is:

1. A minnow and fish preserving container consisting of an insulated open top rectangular receptacle; an insulated closure for sealing engagement with said open top of said receptacle, said receptacle and closure being air and watertight, a cold conducting thin wall partition sealingly positioned within said receptacle so as to form separate large and small chambers for caught fish and live minnows respectively, said chambers being capable of holding different amounts of water and ice at a temperature acting to lower the metabolism of said minnows to substantially increase their life span, said thin wall partition comprising a sheet of thin material, ribs formed on at least one surface of said sheet of thin material.

2. A minnow and fish preserving container consisting of an insulated open top rectangular receptacle; an insulated closure for sealing engagement with said open top of said receptacle, said receptacle and closure being air and watertight, a cold conducting thin wall partition sealingly positioned within said receptacle so as to form separate large and small chambers for caught fish and live minnows respectively, said chambers being capable of holding different amounts of water and ice at a temperature acting to lower the metabolism of said minnows to substantially increase their life span, said partition comprising a sheet of thin material, undulations in said sheet of thin material substantially increasing the area thereof.

* * * * *